United States [11] 3,590,246

| [72] | Inventor | Franz Menke |
| | | Neckargemund, Germany |
| [21] | Appl. No. | 791,963 |
| [22] | Filed | Jan. 17, 1969 |
| [45] | Patented | June 29, 1971 |
| [73] | Assignee | Eltro G.m.b.H. & Co. |
| | | Heidelberg, Germany |
| [32] | Priority | Feb. 16, 1968 |
| [33] | | Germany |
| [31] | | P 16 39 226.0 |

[54] DEVICE FOR MODULATING RADIATION ENERGY AND FOR BUNDLING IT INTO A VERY SMALL SECTION
7 Claims, 2 Drawing Figs.

[52] U.S. Cl............................................. 250/83.3,
250/227, 250/233, 250/237, 350/96
[51] Int. Cl....................................................... G02b 5/14,
G01j 1/02
[50] Field of Search.......................................... 250/83.3,
227, 237, 233; 350/96

[56] References Cited
UNITED STATES PATENTS

| 3,411,010 | 11/1968 | Genaehr et al. .............. | 350/96 |
| 3,411,011 | 11/1968 | Genaehr et al. .............. | 350/96 |
| 2,981,842 | 4/1961 | Kaufold et al. ............... | 250/83.3 IR |
| 3,106,642 | 10/1963 | Shapiro ....................... | 250/83.3 IR |
| 3,224,279 | 12/1965 | Galli et al. .................... | 250/227 X |
| 3,239,672 | 3/1966 | Gabloffsky .................. | 250/83.3 IR |

Primary Examiner—James W. Lawrence
Assistant Examiner—Morton J. Frome
Attorney—Waters, Roditi, Schwartz & Nissen

ABSTRACT: The invention provides a modulation device for electromagnetic radiation such as infrared radiation and the like. The modulator itself consists of a plurality of strips separated by slots through which the radiation can pass. This group of strips constitutes a grid which is rotated about an axis and which feeds modulated energy to a radiation-responsive device. Between the grid and radiation responsive device is provided an optical system consisting of a plurality of fibers which at one end are formed in groups corresponding to the aforesaid slots and which at the other end are bundled into a circular arrangement corresponding to the radiation-responsive device.

DEVICE FOR MODULATING RADIATION ENERGY AND FOR BUNDLING IT INTO A VERY SMALL SECTION

DRAWING

FIG. 1 is a longitudinal section through an arrangement for the reception of radiation, which shows a configuration, devised according to the invention, for the modulation of radiation energy and its collimation onto the surface area of a receiving element; and FIG. 2 is a partial cross section through the arrangement of FIG. 1 along line II–II making the modulator surface visible in plain view.

DETAILED DESCRIPTION

Figure 1:
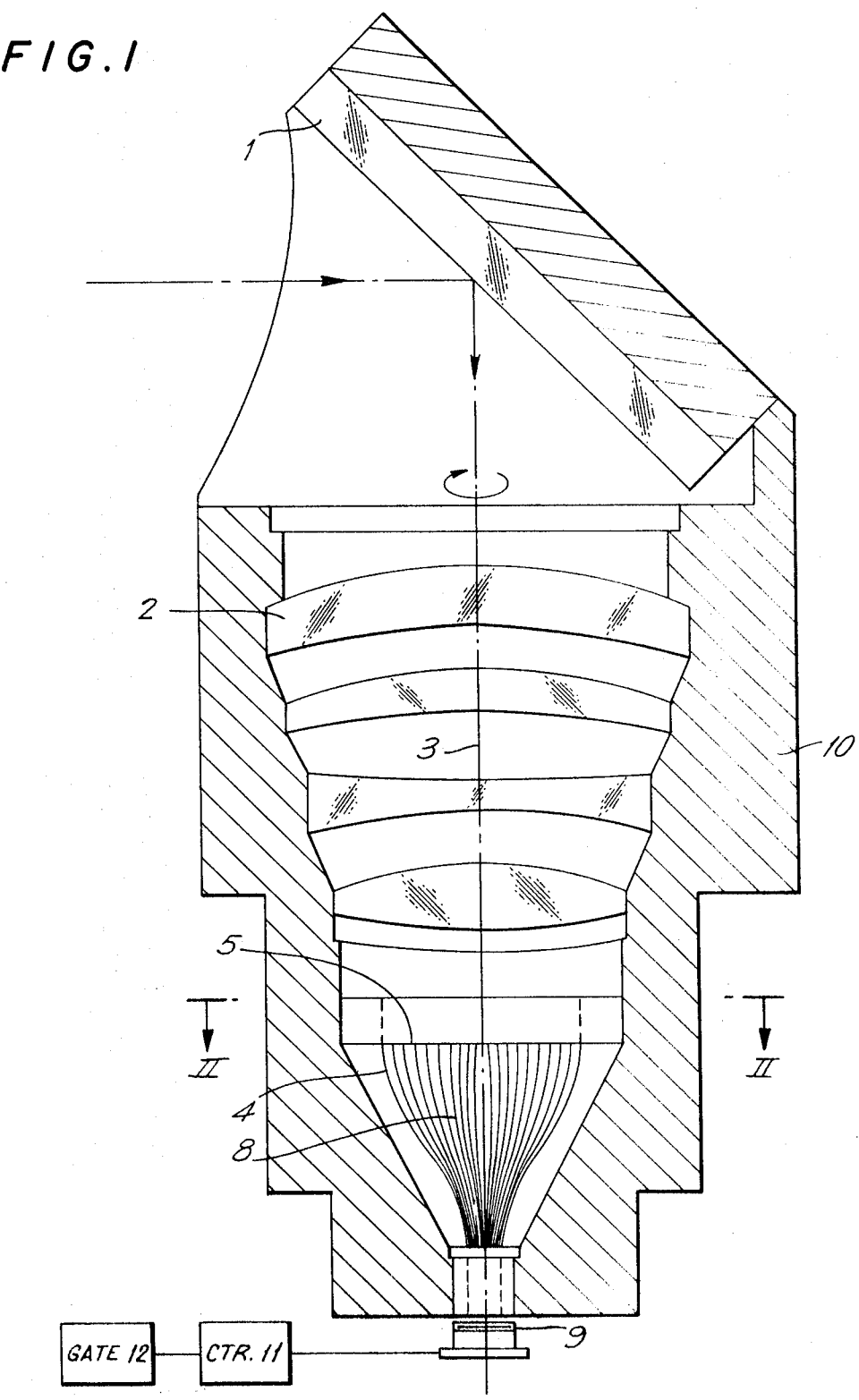

In equipment for receiving radiation such as, for example, optical measuring, dial panoramic sight direction finding and locating sets equipped with photoelectric receivers, it is in many cases necessary to impress a periodic modulation on the received electromagnetic radiation prior to its conversion by the receiver. For this purpose, it is usual to arrange a modulating disc in the intermediate-image plane of the entrance optics, which may, for example, be of circular configuration and possess alternating opaque and translucent sectors. By rotation of this disc around its central axis, the received radiation is chopped, whereafter it arrives at the receiver which follows the modulator disc and from the output terminals of which an AC voltage oscillating at the modulating frequency can then be derived.

If the photoelectric receiver, for the purpose of maximum sensitivity, has a very small surface area, it becomes necessary after the modulation to collimate the radiation once again in order to permit directing it precisely onto the surface of the receiving element and avoid any loss of energy.

Lead sulfate photoresistors, for example, which often serve as receiving elements in IR receivers, possess usable surface areas in the order of magnitude of 1 mm.$^2$ (0.0015 sq. inch), so that it is necessary to take special measures in order to assure a loss-free transmission of the modulated radiation energy to the surface of the receiver element. It is an object of the invention to provide for this loss-free transmission.

The invention succeeds herein by means of an arrangement for modulating radiation energy and collimating it onto the active surface of a light-sensitive receiving element, which arrangement according to the invention involves glass-fiber optics, whose radiation-entrance end, for the purpose of modulation, is provided with opaque bridges and transparent slots in such a manner that between every pair of opaque bridges a number of parallel photoconductor fibers oriented in the sense of entering radiation are closely packed together, whose fiber openings thus combine to form a permeable slot, whereas on the radiation-exit side of the glass-fiber optics the ends of all photoconductor fibers are bundled together to form a stem, the diameter of which is adapted to that of the photoelectric receiving element.

In order to obtain a periodic modulation, the image field can either be moved periodically by means of moving mirror or prism assemblies across the surface of the modulator arranged in the intermediate-image plane of the entrance optics (radiation-entrance end of the glass-fiber optics) with the glass-fiber optics remaining stationary, or means are provided, by which the glass-fiber optics itself can be rotated around its symmetry axis, which is concentrically aligned with the optical axis. In the latter case, the stationary image field is, in a manner in itself known, periodically scanned by the modulator.

The arrangement according to the invention, in any case, provides in a simple way for the surface of the modulator to be reproduced point by point—in a planar conversion—on the surface of the receiving element, and for the radiation energy focused in the intermediate-image plane, after its modulation, to be effectively absorbed by the receiver without losses.

The device for the reception of radiation to be discussed hereinunder can be utilized in apparatus for the purpose of spotting electromagnetic radiation and finding its incidence direction, i.e., as a so-called dial sight panoramic direction finder. A unit of this kind consists essentially of receiving optics which scan the horizon by rotation, followed by a radiation-sensitive receiver arrangement and an indicating mechanism running in perfect synchronism with the rotating optics for correct and precise indication of the directional angle of the incident radiation on a compass rose.

FIG. 1 shows, in optical schematic form, the receiving optics of the dial sight panoramic direction finder, the modulator device mechanically coupled to the receiving optics, in the configuration according to the invention, and the subsequent receiver.

Figure 2:
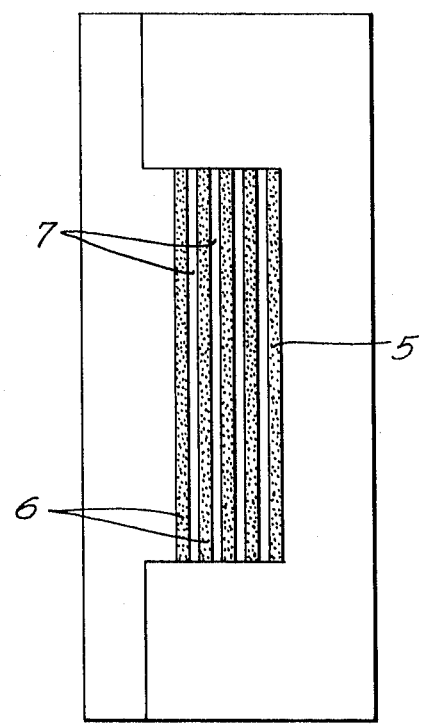

The receiving optics in periscopic construction is composed of the deflecting mirror 1 and the telescopic objective 2. The deflecting mirror 1 forms an angle of 45° with the optical axis 3 of the telescopic objective 2. A far-removed external object emitting radiation is reproduced by the telescopic objective 2 as an image spot on its intermediate-image plane where there is located the radiation-entrance side of the glass-fiber optics 4 which follows the telescopic objective. This radiation-entrance side is shaped to the modulator 5, the surface of which is detailed in FIG. 2. It is devised as a rectangular grid with narrow, parallel translucent slots 6 and bridges 7. Between each two opaque bridges 7 formed, for example, by strips of metal, a number of photoconductor fibers, running parallel to each other and in the direction of radiation incidence are closely packed together. Their fiber openings thus always combine to form a translucent slot 6.

On the radiation-exit side of the glass-fiber optics 4, the ends of all of the photoconductor fibers 8 are bundled into a stem, the diameter of which is adapted to that of the receiver 9. In the example herein discussed, the cross section of the glass-fiber optics 4 is circular on the radiation-exit side.

The deflecting mirror 1, the telescopic objective 2 and the glass-fiber optics 4 with modulator 5 are provided with a common mounting 10. In their arrangement, these elements rotate jointly around the optical axis 3, the drive consisting of a hollow-shaft motor (not shown). Accordingly, the modulator runs in phase with the receiving optics of the dial panoramic sight at a rotary speed of, for example, 5 r.p.m.

With a given number of translucent slots 6, the modulating frequency can serve as unequivocal criterion for differentiating between practically punctiform sources of radiation and others of larger area. The signal derived from the receiver output 9 is supplied to a counter circuit 11 to which is coupled a gate 12 letting a signal pass through to the indicating device only if the number of impulses per pulse sequence generated is equal to the number of translucent slots of the modulator 5. If the number of impulses received is less, then the signal indication is automatically prevented. Thus, only such sources of radiation are indicated, whose image spot diameter in the intermediate-image plane of the telescopic objective 2 is not appreciably larger than the width of a slot 6, since only such sources of radiation result in the required modulation frequency of the output signal from the receiver.

The possible arrangements according to the invention for modulating radiation energy and for bundling it onto the surface of a receiving element are by no means limited to the example in the drawing as many variations are possible, for example, relative to the form of the modulator or the number and configuration of the slots and bridges is conceivable without departing from the scope of the invention.

What I claim is:

1. Apparatus comprising means to receive electromagnetic radiation, radiation means responsive to said radiation, and modulation means interposed between the first two said means and including bridges opaque to said radiation with slots being provided between the bridges through which the radiation can pass and fiber optical means including radiation-conducting fibers having radiation-entrance ends packed in groups corresponding to said slots and aligned in the direction of radiation incidence and radiation-exit ends combined in a bundle corresponding to said means to receive electromagnetic radiation, said modulation means including said fiber-optical means being rotatably supported about an axis parallel to said direction of radiation incidence.

2. Apparatus as claimed in claim 1 wherein the bridges are parallel strips.

3. Apparatus as claimed in claim 2 wherein the bundle is of circular cross section.

4. Apparatus as claimed in claim 3 comprising a rotatable housing supporting all of said means.

5. Apparatus as claimed in claim 1 comprising a counter coupled to the first said means to count the modulated radiation received thereby.

6. Apparatus as claimed in claim 5 comprising a gate coupled to the counter to pass a signal when the modulated radiation includes a number of pulses corresponding to the number of slots.

7. Apparatus as claimed in claim 2 wherein the bridges and slots are rectilinear in shape.